United States Patent
Long

(10) Patent No.: US 10,830,099 B2
(45) Date of Patent: Nov. 10, 2020

(54) FUSE JOINT WITH FENESTRATED FUSE PIN

(71) Applicant: United Technologies Corporation, Farmington, CT (US)

(72) Inventor: Wesley P. Long, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 467 days.

(21) Appl. No.: 15/817,737

(22) Filed: Nov. 20, 2017

(65) Prior Publication Data

US 2019/0157032 A1 May 23, 2019

(51) Int. Cl.
*F01D 25/24* (2006.01)

(52) U.S. Cl.
CPC ...... *F01D 25/243* (2013.01); *F05D 2260/311* (2013.01); *Y10T 403/11* (2015.01)

(58) Field of Classification Search
CPC .... F01D 21/045; F01D 25/162; F01D 25/243; F05D 2260/311; F16B 31/021; F16B 35/048; F16B 2200/506; Y10T 403/11; Y10T 403/645; Y10T 403/75
USPC ...... 464/32, 33; 403/2, 337, 408.1; 248/548, 248/549
See application file for complete search history.

(56) References Cited

U.S. PATENT DOCUMENTS

| 5,461,852 | A | 10/1995 | Nagamatsu | |
| 8,398,345 | B2 * | 3/2013 | Pratt | F16B 31/021 |
| | | | | 411/39 |
| 9,062,701 | B2 | 6/2015 | Hyatt | |
| 10,012,149 | B2 * | 7/2018 | Jiang | F01D 21/045 |
| 10,215,098 | B2 * | 2/2019 | Cherolis | F01D 25/162 |
| 10,253,644 | B2 * | 4/2019 | LeBlanc | F01D 25/246 |
| 2013/0042630 | A1 | 2/2013 | Muldoon | |
| 2014/0314546 | A1 * | 10/2014 | Davis | F01D 21/045 |
| | | | | 415/124.1 |
| 2016/0153315 | A1 | 6/2016 | Kapustka | |

FOREIGN PATENT DOCUMENTS

FR 3006713 B1 10/2016

OTHER PUBLICATIONS

EP search report for EP18207107.6 dated Mar. 14, 2019.

* cited by examiner

*Primary Examiner* — Josh Skroupa
(74) *Attorney, Agent, or Firm* — Getz Balich LLC

(57) ABSTRACT

An assembly that includes a first mount, a second mount and a fuse pin. The first mount is configured with a first aperture. The second mount is configured with a second aperture. The fuse pin is mated with the first aperture and the second aperture. The fuse pin connects the first mount and the second mount together. The fuse pin has an axis, and is configured with a plurality of slots arranged circumferentially about the axis. A first of the slots has a length measured along the axis. The second mount has a thickness measured along the axis at an interface between the fuse pin and the second mount. The length is greater than the thickness.

20 Claims, 8 Drawing Sheets

FUSE JOINT WITH FENESTRATED FUSE PIN

BACKGROUND OF THE DISCLOSURE

1. Technical Field

This disclosure relates generally to a joint and, more particularly, to a fuse joint with a fuse pin.

2. Background Information

Various types and configurations of fuse joints are known in the art. While these fuse joints have various benefits, there is still room in the art for improvement. For example, a fuse pin of a typical fuse joint includes a pair of axially spaced annular grooves in an outer periphery of the fuse pin. The recesses function as stress concentrators in the fuse pin. When the fuse pin is subject to a load over a certain threshold, the fuse pin is designed to fracture at the stress concentrators. During fuse pin design, the goal is to size the recesses to be limited in an ultimate condition, but not to fail under high cycle fatigue ("HCF"). This goal can be challenging, however, where the calculated fuse load is relatively small. Calculated sheer sections may also be too small to reliably machine or may cause the pin to fail in high cycle fatigue conditions.

SUMMARY OF THE DISCLOSURE

According to an aspect of the present disclosure, an assembly is provided that includes a first mount, a second mount and a fuse pin. The first mount is configured with a first aperture. The second mount is configured with a second aperture. The fuse pin is mated with the first aperture and the second aperture. The fuse pin connects the first mount and the second mount together. The fuse pin has an axis. The fuse pin is configured with a plurality of slots arranged circumferentially about the axis. A first of the slots has a length measured along the axis. The second mount has a thickness measured along the axis at an interface between the fuse pin and the second mount. The length is greater than the thickness.

According to another aspect of the present disclosure, another assembly is provided that includes a first mount, a second mount and a fuse pin. The first mount is configured with a first aperture. The second mount is configured with a second aperture. The fuse pin is within the first aperture and the second aperture. The fuse pin connects the first mount and the second mount together. The fuse pin is configured with a plurality of slots arranged circumferentially about an axis of the fuse pin. A first of the slots completely overlaps the second mount along the axis at an interface between the fuse pin and the second mount.

The first of the slots may have a length measured along the axis. The second mount may have a thickness measured along the axis at an interface between the fuse pin and the second mount. The length may be greater than the thickness.

The fuse pin may be configured to transfer a load between the first mount and the second mount when the load is less than a threshold. The fuse pin may also or alternatively be configured to deform and/or fracture at the slots when the load is greater than or equal to the threshold.

The first of the slots may be configured as or otherwise include an axially extending slot.

The first of the slots may extend radially through the fuse pin.

The fuse pin may include a tubular sidewall that extends axially along and circumferentially around the axis. Each of the slots may extend radially through the tubular sidewall.

The first of the slots may completely axially overlap the second mount at the interface along the axis.

The assembly may also include a fuse joint connecting the first mount and the second mount together. The fuse joint may include at least the fuse pin. The fuse joint may be configured to substantially prevent movement between the first mount and the second mount when the fuse joint is subject to loading less than a threshold. The fuse joint may be configured to permit constrained movement between the first mount and the second mount when the loading is greater than the threshold.

The fuse joint may also include a fastener configured to connect the first mount and the second mount together when the loading is greater than the threshold.

The fastener may be arranged concentrically within the fuse pin.

The fastener may be arranged next to the fuse pin.

The fuse mount may include a first flange and a second flange. The first flange may be configured with the first aperture. The second flange may be configured with a third aperture. The second mount may be disposed between the first flange and the second flange. The fuse pin may project axially through the first aperture. The second aperture and the third aperture may connect the second mount to the first flange and the second flange.

The fuse pin may include a first bearing portion, a second bearing portion and a fenestrated bearing portion. The first bearing portion may be mated with the first aperture. The second bearing portion may be mated with the third aperture. The fenestrated bearing portion may be mated with the second aperture. The fenestrated bearing portion may be disposed axially between the first bearing portion and the second bearing portion. The fenestrated bearing portion may include the slots.

The assembly may also include a bushing within the third aperture. The bushing may circumscribe the second bearing portion.

The fuse pin may include a shoulder axially abutted against the first flange.

The assembly may also include a nut mated with a threaded portion of the fuse pin and bearing axially against the second flange.

The assembly may also include a first component of a gas turbine engine and a second component of the gas turbine engine. The first component may be attached to the first mount. The second component may be attached to the second mount.

The first component may be configured as or otherwise include an oil tank. The second component may be configured as or otherwise include a turbine engine case.

The foregoing features and the operation of the disclosure will become more apparent in light of the following description and the accompanying drawings.

DETAILED DESCRIPTION

Figure 1:
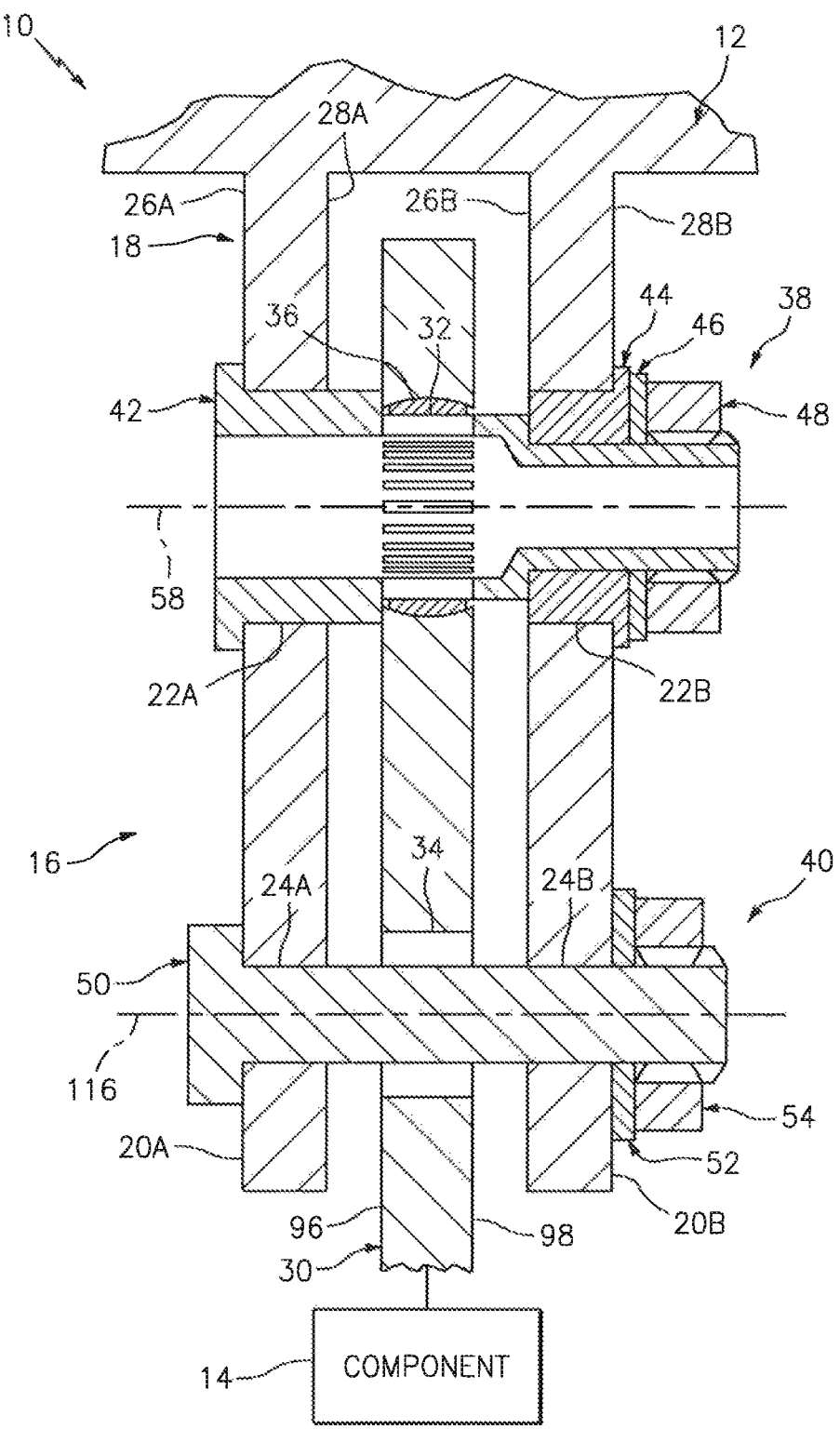
FIG. 1 is a partial sectional illustration of an assembly for an apparatus such as a gas turbine engine.

FIG. 1 is a partial sectional illustration of an assembly 10 for an apparatus such as, but not limited to, a gas turbine engine of an aircraft propulsion system. This assembly 10 includes a first component 12 of the apparatus (e.g., an oil tank), a second component 14 of the apparatus (e.g., a fan or core case) and a fuse joint 16 connecting the first component 12 and the second component 14 together. While the assembly 10 is described herein with respect to an exemplary gas turbine engine embodiment, the fuse joint 16 of the present disclosure may alternatively be used for other non-gas turbine engine applications.

A first mount 18 is connected to (or included with) the first component 12. The first mount 18, for example, may be formed integral with or mechanically fastened, welded, brazed, adhered and/or otherwise attached to the first component 12. The first mount 18 of FIG. 1 includes a pair of parallel first mount flanges 20A and 20B (generally referred to as "20"). Each of these flanges 20 is configured with one or more fastener apertures 22A, 22B (generally referred to as "22") and 24A, 24B (generally referred to as "24"); e.g., through-holes. Each fastener aperture 22, 24 extends through the respective flange 20 between opposing side surfaces 26A, 26B and 28A, 28B of the respective flange 20.

A second mount 30 is connected to (or included with) the second component 14. The second mount 30, for example, may be formed integral with or mechanically fastened, welded, brazed, adhered and/or otherwise attached to the second component 14. The second mount 30 of FIG. 1 is configured as a tongue (e.g., a flange), which is operable to be positioned within a groove formed by and between the flanges 20 of the first mount 18. The second mount 30 is configured with one or more fastener apertures 32 and 34; e.g., through holes. The first fastener aperture 32 of FIG. 1 is formed by a spherical bearing 36 configured with the second mount 30. However, in other embodiments, the first fastener aperture 32 may be formed directly by the second mount tongue and the spherical bearing 36 may be omitted.

The fuse joint 16 of FIG. 1 includes a fuse pin assembly 38 and a fastener assembly 40. The fuse pin assembly 38 includes a fuse pin 42, a flanged bushing 44, a washer 46 and a nut 48. The fastener assembly 40 includes a fastener 50 (e.g., a bolt), a washer 52 and a nut 54.

Figure 2:
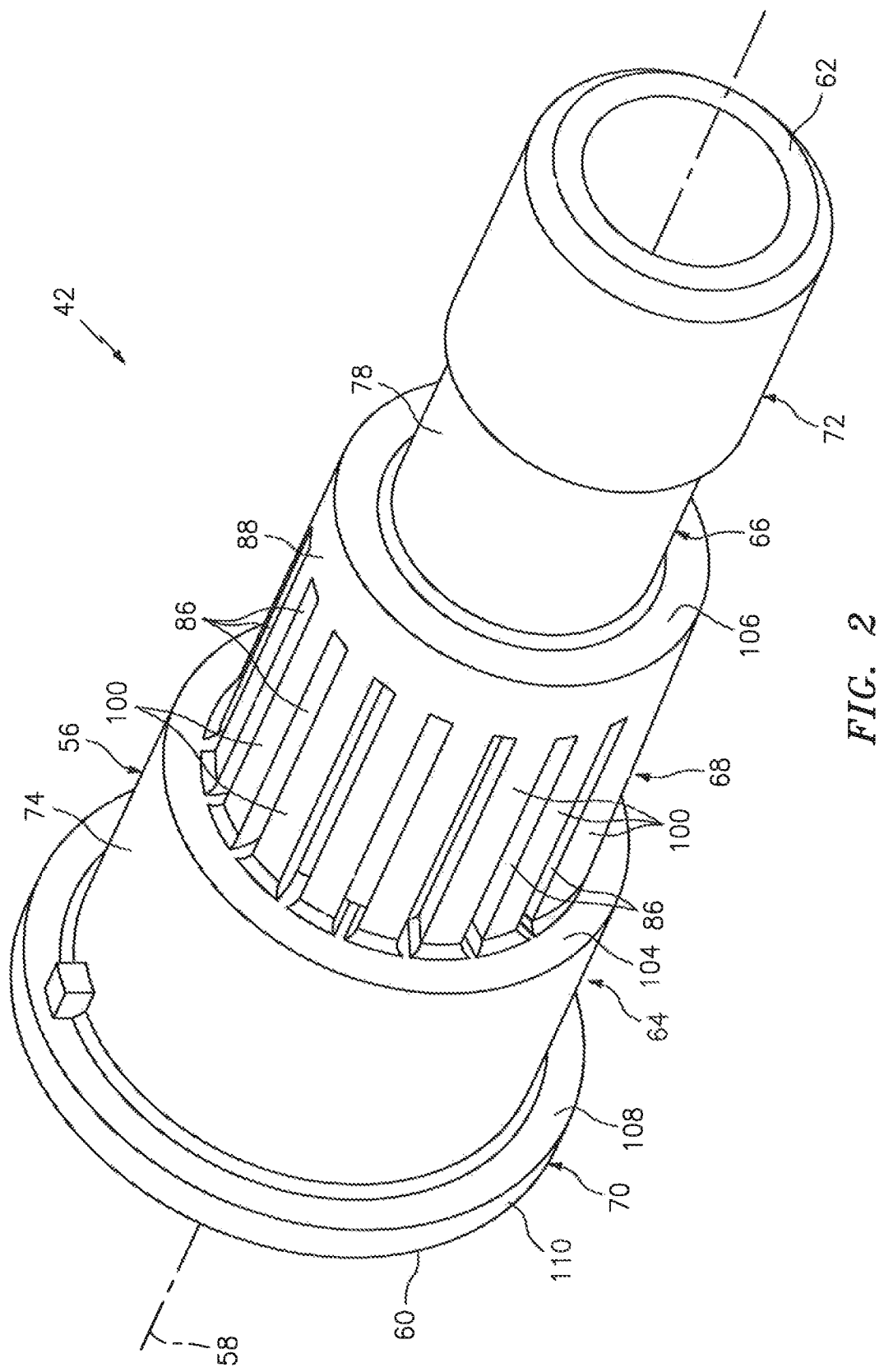
FIG. 2 is a perspective illustration of a fuse pin.
Figure 3:
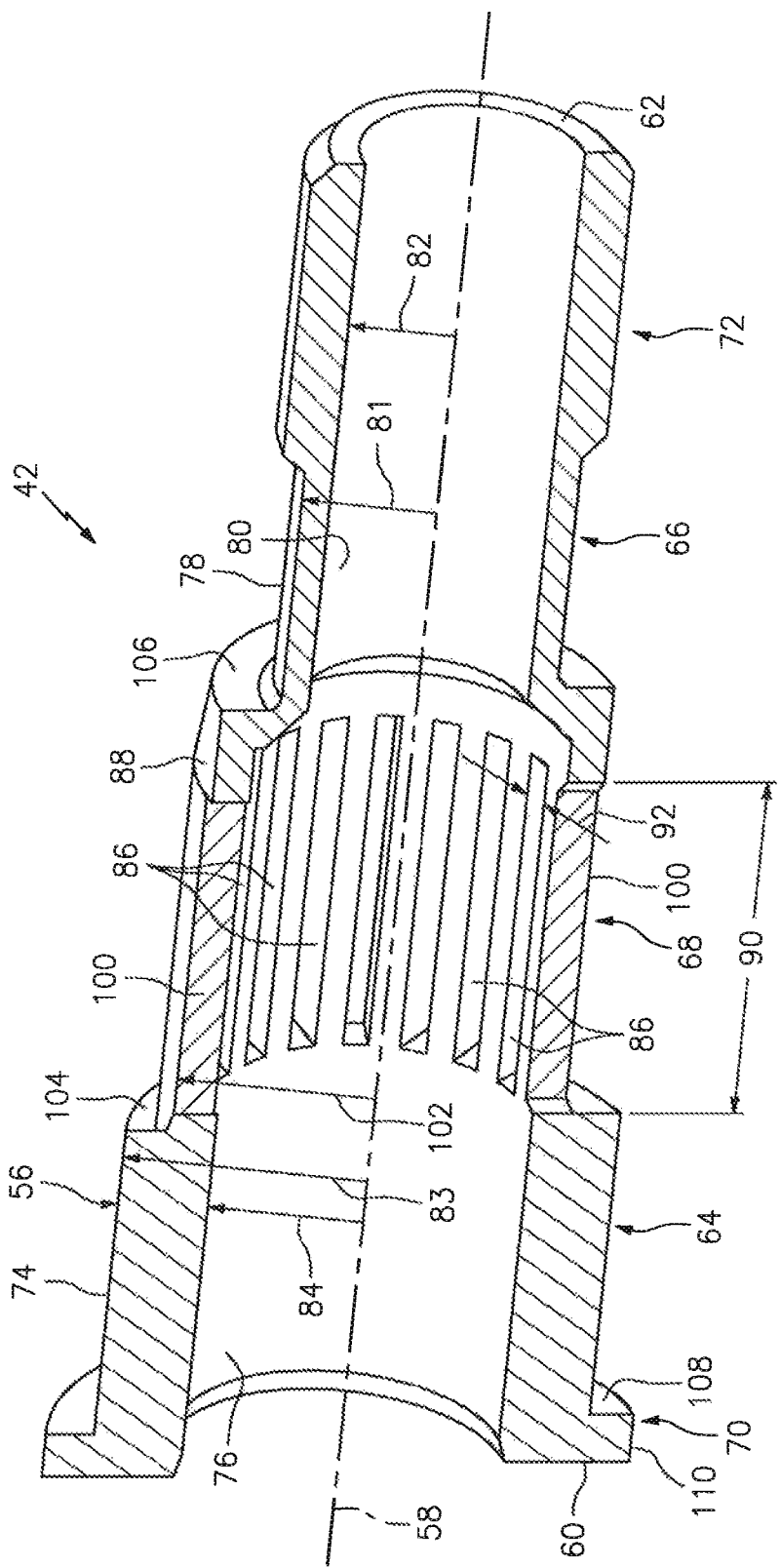
FIG. 3 is a side section perspective illustration of the fuse pin.

Referring to FIGS. 2 and 3, the fuse pin 42 is configured as a hollow pin. The fuse pin 42 of FIGS. 2 and 3, for example, is configured with a tubular sidewall 56 that extends axially along a central axis 58 of the fuse pin 42 between opposing axial ends 60 and 62 of the fuse pin 42. The sidewall 56 forms a central bore that extends axially through the fuse pin 42; however, in other embodiments, this bore may alternatively extend axially into the fuse pin 42 or axially within at least a central portion of the fuse pin 42.

The fuse pin 42 of FIGS. 2 and 3 includes an end bearing portion 64, an end bearing portion 66 and an intermediate bearing portion 68 (e.g., a fenestrated bearing portion). The fuse pin 42 of FIGS. 2 and 3 also includes a rim portion 70 and a threaded portion 72.

The end bearing portion 64 is arranged and/or extends axially between the rim portion 70 and a first side of the intermediate bearing portion 68. This end bearing portion 64 is configured with a substantially solid (e.g., axially, circumferentially and/or radially uninterrupted) tubular segment of the sidewall 56. The end bearing portion 64 extends radially between a first outer surface 74 of the fuse pin 42 and a first inner surface 76 of the fuse pin 42.

The end bearing portion 66 is arranged and/or extends axially between the threaded portion 72 and a second side of the intermediate bearing portion 68. This end bearing portion 66 is configured with another substantially solid (e.g., axially, circumferentially and/or radially uninterrupted) tubular segment of the sidewall 56. The end bearing portion 66 extends radially between a second outer surface 78 of the fuse pin 42 and a second inner surface 80 of the fuse pin 42. In the specific embodiment of FIG. 3, a radius 81 of the second outer surface 78 is less than a radius 83 of the first outer surface 74. A radius 82 of the second inner surface 80 is less than a radius 84 of the first inner surface 76. With such an arrangement, an annular taper (or alternatively a shelf) is formed between the first inner surface 76 and the second inner surface 80.

The intermediate bearing portion 68 is arranged and/or extends axially between the end bearing portion 64 and the end bearing portion 66. This intermediate bearing portion 68 is configured with a fenestrated (e.g., slotted) tubular segment of the sidewall 56. The intermediate bearing portion 68, for example, is configured with a plurality of slots 86. These slots 86 are arranged circumferentially about the axis 58 in an annular array. Each of the slots 86 extends radially through the sidewall 56 between a third outer surface 88 of the fuse pin 42 and the first inner surface 76 of the fuse pin 42.

Figure 4:
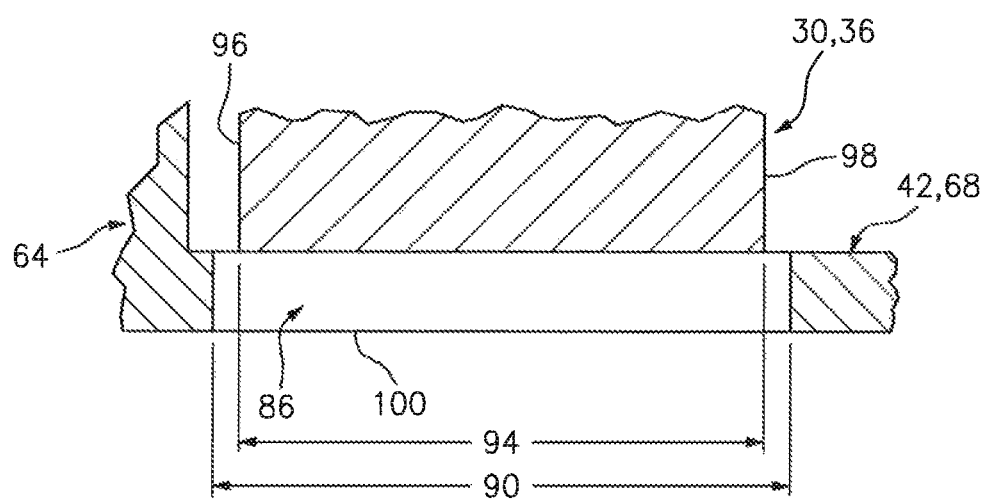
FIG. 4 is a partial sectional illustration of an interface between the fuse pin and a mount.

Each of the slots 86 is configured as an axially extending slot such that an axial length 90 of the respective slot 86 is greater than a lateral (e.g., circumferential or tangential) width 92 of the respective slot 86. Referring to FIG. 4, the axial length 90 of each slot 86 is sized to be greater than (or equal to) an axial thickness 94 of the second mount 30 at an interface between the fuse pin 42 and the second mount 30. In this manner, each slot 86 may completely axially overlap the second mount 30 (e.g., the spherical bearing 36) at the interface. Each slot 86 may also project axially beyond the second mount 30 at a first side 96 and/or a second side 98 of the second mount 30.

Referring again to FIGS. 2 and 3, each of the slots 86 is formed laterally between a respect pair of laterally adjacent beams 100. These beams 100 are arranged in an annular array about the axis 58 and thereby form the fenestrated tubular segment of the sidewall 56.

In the specific embodiment of FIG. 3, a radius 102 of the third outer surface 88 is less than the radius 83 of the first outer surface 74 and greater than the radius 81 of the second outer surface 78. With such an arrangement, an annular shelf 104 is formed between the first outer surface 74 and the third outer surface 88. Another annular shelf 106 is formed between the second outer surface 78 and the third outer surface 88.

The rim portion 70 of FIGS. 2 and 3 is disposed at the first axial end 60. The rim portion 70 includes an annular shelf surface 108 that is adjacent and may be contiguous with the first outer surface 74. The shelf surface 108, for example, extends radially outward from the first outer surface 74 to a distal, outer peripheral end 110 of the rim portion 70.

The threaded portion 72 of FIGS. 2 and 3 is disposed at the second axial end 62. This threaded portion 72 is configured to receive the nut 48 as shown in FIG. 1.

Figure 5:
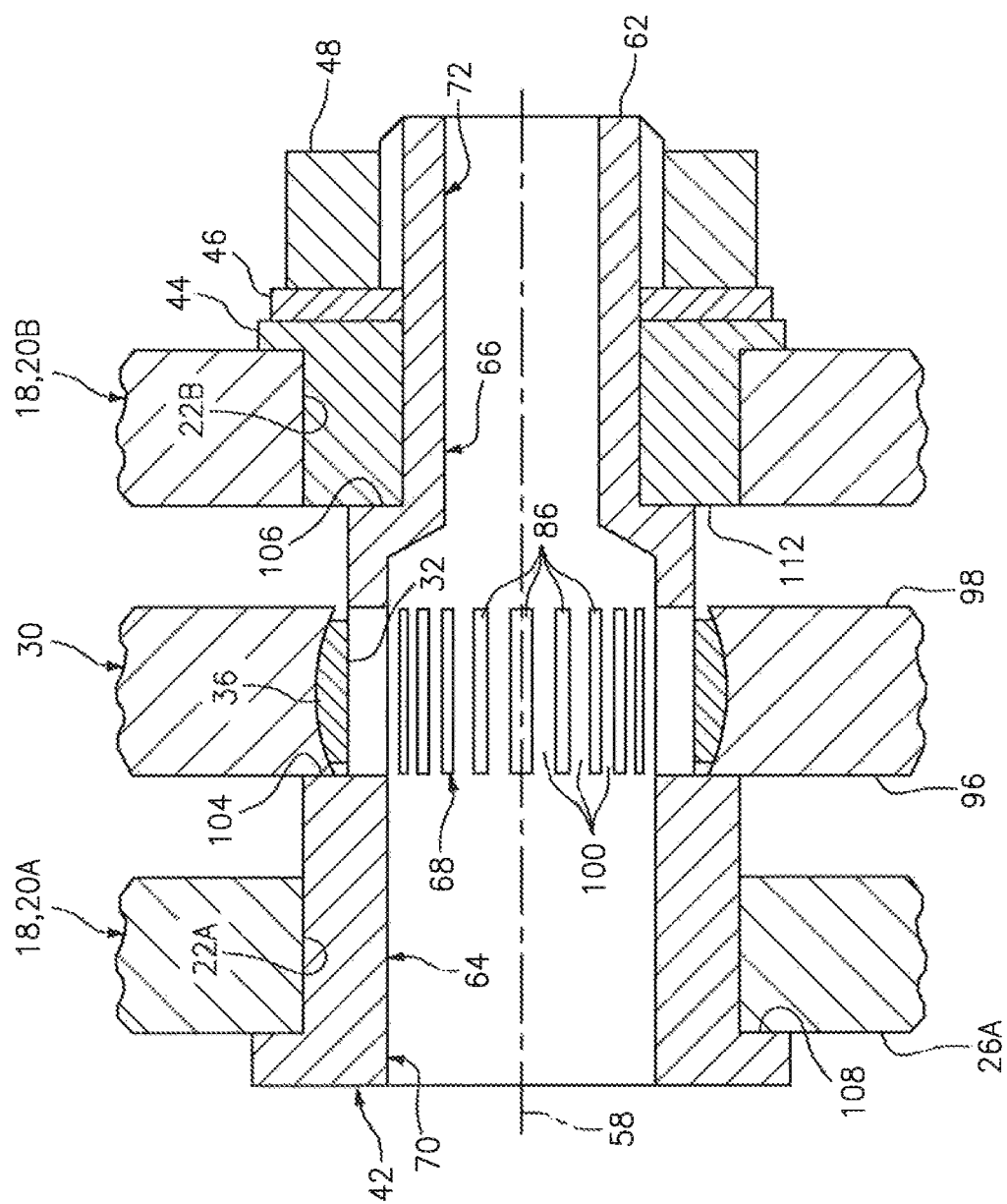
FIG. 5 is a partial sectional illustration of a portion of the assembly including the fuse pin.

Referring to FIG. 5, the fuse pin 42 is mated with the fastener apertures 22A, 32 and 22B to connect the second mount 30 to the first mount 18. For example, the second end 62 of the fuse pin 42 is inserted into the fastener aperture 22A. The fuse pin 42 is then translated along its axis 58 (and respective coaxial axes of the apertures 22A, 32 and 22B) to pass the second end 62 of the fuse pin 42 sequentially through the fastener apertures 22A, 32 and 22B until the rim portion 70 and, more particularly, the shelf surface 108 axially engages (e.g., contacts or otherwise bears against) the first side surface 26A of the first flange 20A. The bushing 44 may then be mated with the end bearing portion 66 and the fastener aperture 22B such that the end bearing portion 66 projects axially through a central bore of the bushing 44 and the bushing 44 is within the fastener aperture 22B. The bushing 44 thereby circumscribes the end bearing portion 66 and provides a buffer/support/intermediate body between the fuse pin 42 and the second flange 20B. The washer 46 and the nut 48 are subsequently mated with the fuse pin 42. In particular, the fuse pin 42 (e.g., the threaded portion 72 and/or the end bearing portion 66) projects through the washer 46 and the nut 48 is threaded onto the threaded portion 72.

With the foregoing configuration, the shelf 104 axially engages (e.g., contacts or otherwise bears against) the first side 96 of the second mount 30 and the shelf 106 axially engages (e.g., contacts or otherwise bears against) an inside end surface 112 of the bushing 44. The intermediate bearing portion 68 and its slots 86 are aligned, along the axis 58, with the second mount 30 and its spherical bearing 36. Thus, the spherical bearing 36 radially engages the beams 100 and not, for example, the segments of the sidewall 56 axially adjacent the beams 100. Thus, radial loads transferred between the second mount 30 and the fuse pin 42 pass (e.g., only) through the intermediate bearing portion 68 and, more particularly, through the beams 100.

Figure 6:
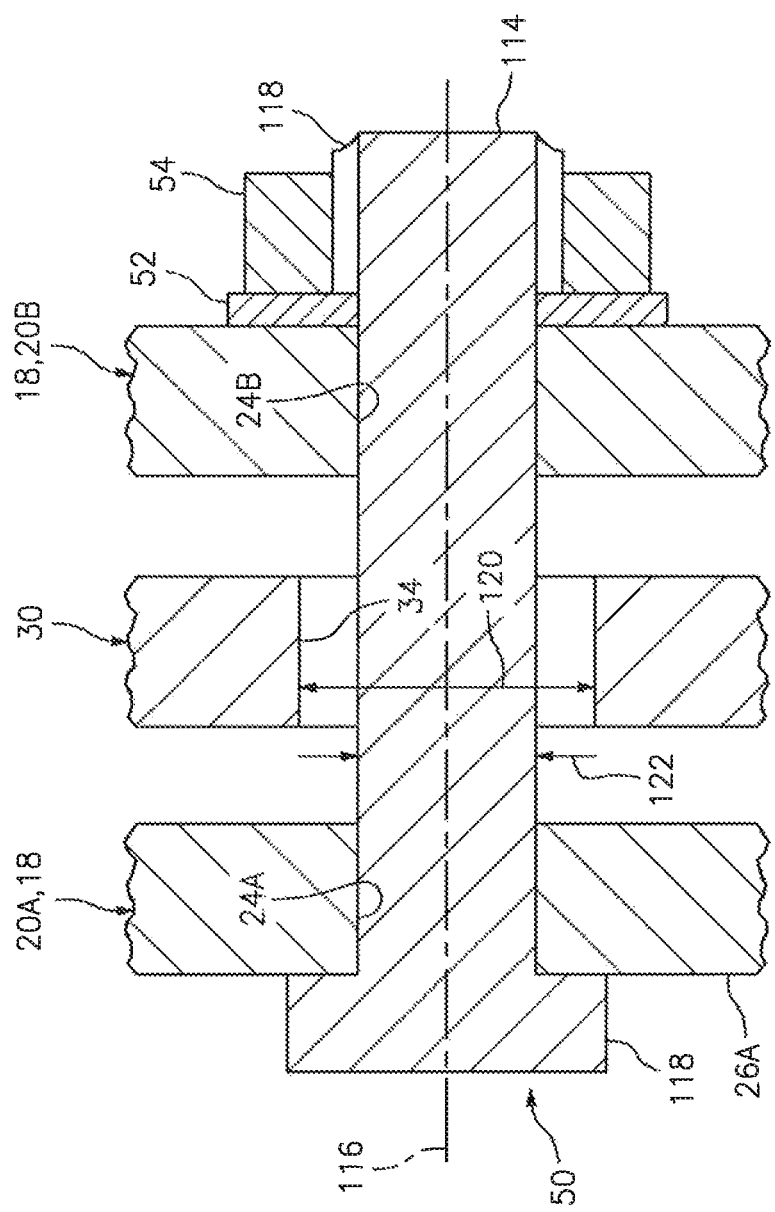
FIG. 6 is a partial sectional illustration of a portion of the assembly including a fastener.

Referring now to FIG. 6, the fastener 50 is mates with the fastener apertures 24A, 34 and 24B to further connect the second mount 30 to the first mount 18. For example, a distal end 114 of the fastener 50 is inserted into the fastener aperture 24A. The fastener 50 is then translated along its axis 116 (and respective coaxial axes of the apertures 24A, 34 and 24B) to pass the distal end 114 of the fastener 50 sequentially through the fastener apertures 24A, 34 and 24B until a head 118 of the fastener 50 axially engages (e.g., contacts or otherwise bears against) the first side surface 26A of the first flange 20A. The washer 52 and the nut 54 are subsequently mated with the fastener 50. In particular, the fastener 50 projects through the washer 52 and the nut 54 is threaded onto a threaded portion 118 of the fastener 50. Note, the fastener aperture 34 is sized with a diameter 120 larger than a diameter 122 of a respective intermediate portion of the fastener 50 such that the intermediate portion of the fastener 50 does not radially engage the second mount 30 during normal operation. As a result, the fastener 50 does not transfer (e.g., any) loads between the first mount 18 and the second mount 30 during normal operation.

Figure 7:
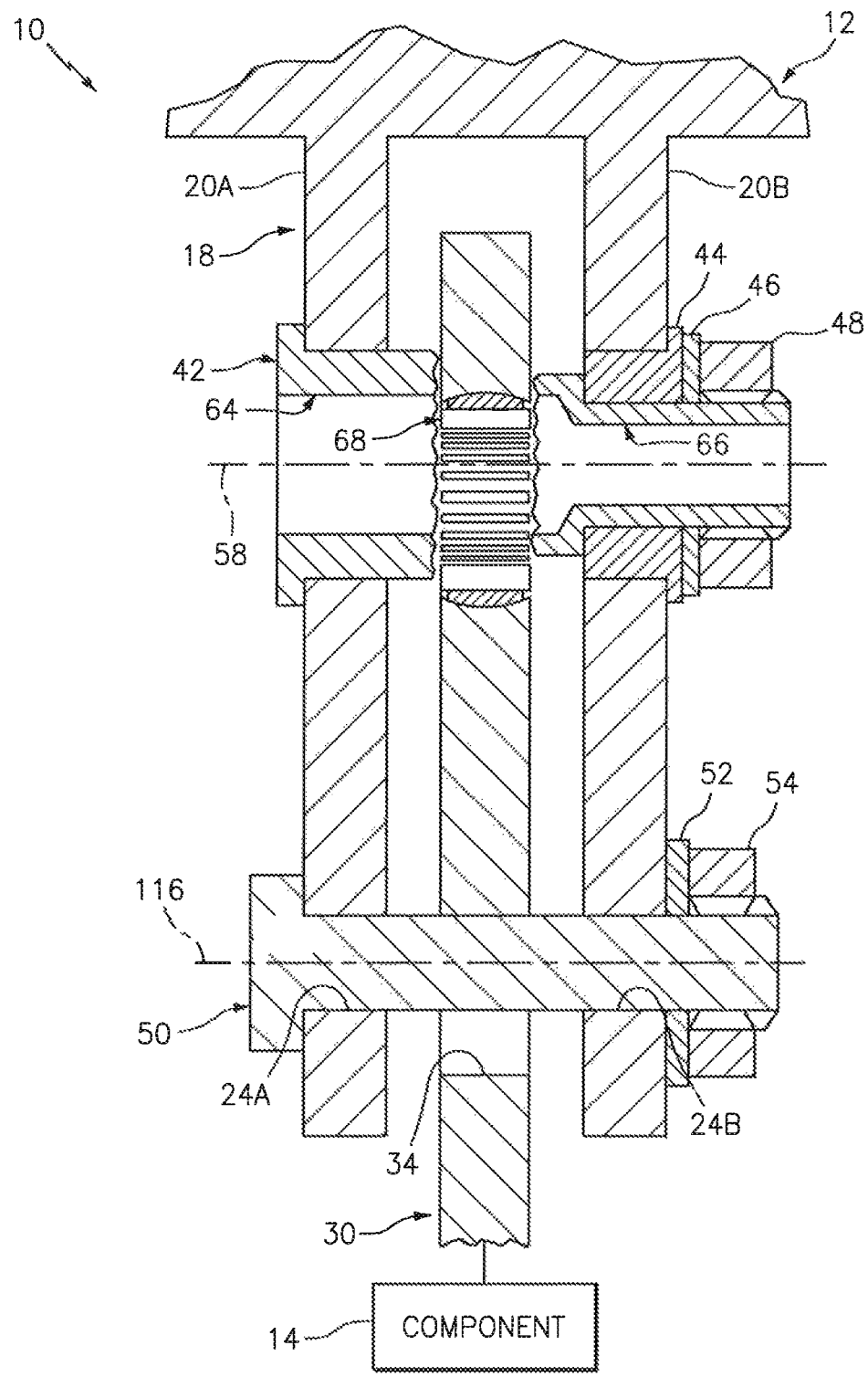
FIG. 7 is a partial sectional illustration of the assembly during off-nominal operation.

FIG. 1 illustrates the assembly 10 during normal operating conditions. During these conditions, the fuse pin 42 is operable to transfer loads between the first mount 18 and the second mount 30 up to a threshold. However, when the fuse pin 42 is subjected to loads that are equal to or exceed the threshold, the fuse pin 42 is operable to deform and/or fracture as shown in FIG. 7. Upon deformation/fracture, the fuse pin 42 enables the first mount 18 to move relative to the second mount 30. This relative movement, however, is controlled by the fastener 50. In particular, after deformation/fracture of the fuse pin 42, the fastener 50 is operable to now radially engage the second mount 30 and transfer (e.g., radial) loads between the first mount 18 and the second mount 30 and well as maintain a loose/compliant connection between the mounts 18 and 30.

Figure 8:
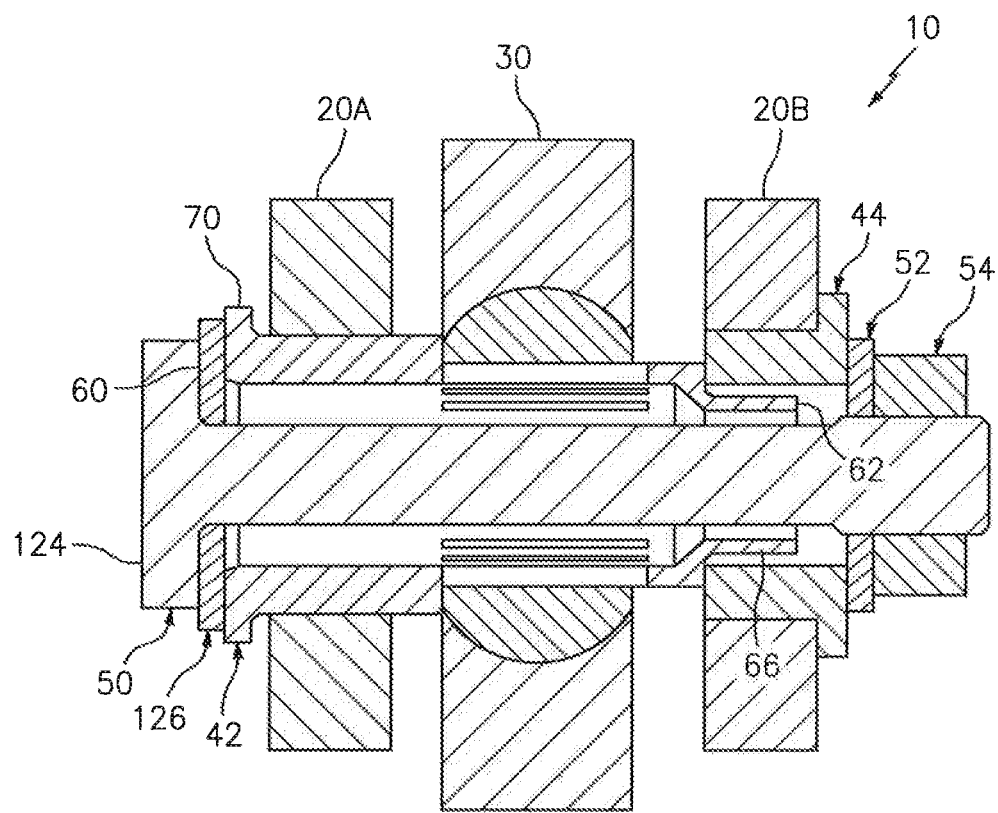
FIG. 8 is a partial sectional illustration of another assembly with a concentric fuse pin and fastener.

In some embodiments, referring to FIG. 8, the fastener 50 may project through and may be concentric with the fuse pin 42. In such an embodiment, the fuse pin 42 may omit the threaded portion 72 (see FIG. 2) such that the end bearing portion 66 defines the distal axial end 62. A head 124 of the fastener 50 may axially engage the rim portion 70 at the axial end 60 indirectly through, for example, a washer 126 (or alternatively directly). The nut 54 may axially engage the bushing 44 indirectly through, for example, the washer 52 (or alternatively directly). Of course, in other embodiments the orientation of the fastener 50 may be reversed such that the head engages the bushing 44 and the nut engages the fuse pin 42.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly, comprising:
    a first mount configured with a first aperture;
    a second mount configured with a second aperture; and
    a fuse pin mated with the first aperture and the second aperture, and connecting the first mount and the second mount together;
    the fuse pin having an axis, and configured with a plurality of slots arranged circumferentially about the axis;
    wherein a first of the slots has a length measured along the axis, the second mount has a thickness measured along the axis at an interface between the fuse pin and the second mount, and the length is greater than the thickness.

2. The assembly of claim 1, wherein the first of the slots comprises an axially extending slot.

3. The assembly of claim 1, wherein the first of the slots extends radially through the fuse pin.

4. The assembly of claim 1, wherein the fuse pin comprises a tubular sidewall that extends axially along and circumferentially around the axis, and each of the slots extends radially through the tubular sidewall.

5. The assembly of claim 1, wherein the first of the slots completely axially overlaps the second mount at the interface along the axis.

6. The assembly of claim 1, further comprising:
    a fuse joint connecting the first mount and the second mount together, and comprising the fuse pin;
    wherein the fuse joint is configured to substantially prevent movement between the first mount and the second mount when the fuse joint is subject to loading less than a threshold; and wherein the fuse joint is configured to permit constrained movement between the first mount and the second mount when the loading is greater than the threshold.

7. The assembly of claim 6, wherein the fuse joint further comprises a fastener configured to connect the first mount and the second mount together when the loading is greater than the threshold.

8. The assembly of claim 7, wherein the fastener is arranged concentrically within the fuse pin.

9. The assembly of claim 7, wherein the fastener is arranged next to the fuse pin.

10. The assembly of claim 1, wherein the fuse pin is configured to
transfer a load between the first mount and the second mount when the load is less than a threshold; and
deform and/or fracture at the slots when the load is greater than or equal to the threshold.

11. The assembly of claim 1, wherein
the first mount includes a first flange and a second flange, the first flange is configured with the first aperture, and the second flange is configured with a third aperture;
the second mount is disposed between the first flange and the second flange; and
the fuse pin projects axially through the first aperture, the second aperture and the third aperture connecting the second mount to the first flange and the second flange.

12. The assembly of claim 11, wherein the fuse pin comprises
a first bearing portion mated with the first aperture;
a second bearing portion mated with the third aperture; and
a fenestrated bearing portion mated with the second aperture and disposed axially between the first bearing portion and the second bearing portion, and the fenestrated bearing portion comprises the slots.

13. The assembly of claim 12, further comprising a bushing within the third aperture and circumscribing the second bearing portion.

14. The assembly of claim 11, wherein the fuse pin comprises a shoulder axially abutted against the first flange.

15. The assembly of claim 11, further comprising a nut mated with a threaded portion of the fuse pin and bearing axially against the second flange.

16. The assembly of claim 1, further comprising:
a first component of a gas turbine engine attached to the first mount; and
a second component of the gas turbine engine attached to the second mount.

17. The assembly of claim 16, wherein the first component comprises an oil tank, and the second component comprises a turbine engine case.

18. An assembly, comprising:
a first mount configured with a first aperture;
a second mount configured with a second aperture; and
a fuse pin within the first aperture and the second aperture, the fuse pin connecting the first mount and the second mount together, and the fuse pin configured with a plurality of slots arranged circumferentially about an axis of the fuse pin;
wherein a first of the slots completely overlaps the second mount along the axis at an interface between the fuse pin and the second mount.

19. The assembly of claim 18, wherein
the first of the slots has a length measured along the axis;
the second mount has a thickness measured along the axis at an interface between the fuse pin and the second mount; and
the length is greater than the thickness.

20. The assembly of claim 18, wherein the fuse pin is configured to
transfer a load between the first mount and the second mount when the load is less than a threshold; and
deform and/or fracture at the slots when the load is greater than or equal to the threshold.

* * * * *